United States Patent [19]

Singh

[11] Patent Number: 5,005,355

[45] Date of Patent: * Apr. 9, 1991

[54] METHOD OF SUPPRESSING FORMATION OF CONTRAILS AND SOLUTION THEREFOR

[75] Inventor: Surjit Singh, Williamsville, N.Y.

[73] Assignee: Scipar, Inc., Williamsville, N.Y.

[ * ] Notice: The portion of the term of this patent subsequent to Aug. 30, 2005 has been disclaimed.

[21] Appl. No.: 235,670

[22] Filed: Aug. 24, 1988

[51] Int. Cl.$^5$ .......................... F02K 3/04; C09K 3/18; B01D 7/02

[52] U.S. Cl. ........................ 60/204; 252/358; 252/319; 252/70; 60/264; 239/2.1; 239/8

[58] Field of Search ............... 252/358, 321, 319, 70; 239/8, 2.1; 60/273, 282, 264, 204

[56] References Cited

U.S. PATENT DOCUMENTS

| | | | |
|---|---|---|---|
| 2,835,530 | 5/1958 | Schneider | 299/28 |
| 2,908,442 | 10/1959 | Stone | 239/2 |
| 2,962,450 | 11/1960 | Elod et al. | 252/319 |
| 3,032,971 | 5/1962 | Shotton | 60/205 X |
| 3,096,290 | 7/1963 | Duane et al. | 252/70 |
| 3,289,409 | 12/1966 | Schirmer | 60/205 |
| 3,429,507 | 2/1969 | Jones | 239/2 |
| 3,517,505 | 6/1970 | Anderson et al. | 60/39.5 |
| 3,517,512 | 6/1970 | Anderson et al. | 60/264 |
| 3,537,900 | 11/1970 | Halbert | 134/42 |
| 3,608,810 | 9/1971 | Kooser | 239/2 |
| 3,608,820 | 9/1971 | Kooser | 239/2 |
| 3,630,913 | 12/1971 | Scott, Jr. et al. | 252/70 |
| 3,647,710 | 3/1972 | Stange | 252/319 |
| 3,722,815 | 3/1973 | Moore | 239/2 |
| 3,802,624 | 4/1974 | Kuhne et al. | 239/2 |
| 3,804,328 | 4/1974 | Lane et al. | 239/2 |
| 4,176,790 | 12/1979 | Osorio | 239/2 |
| 4,335,980 | 6/1982 | DePriester | 405/217 |
| 4,358,389 | 11/1982 | Konig-Lumer et al. | 252/70 |
| 4,362,271 | 12/1982 | Montmory | 239/2 |
| 4,766,725 | 8/1988 | Singh | 252/321 X |
| 4,808,235 | 2/1989 | Woodson et al. | 252/170 X |

OTHER PUBLICATIONS

J. L. Schmitt et al., *Binary nucleation of ethanol and water*, J. Chem. Phys., vol. 92, No. 6, 15 Mar. 1990.

*Primary Examiner*—Richard D. Lovering
*Assistant Examiner*—Daniel S. Metzmaier
*Attorney, Agent, or Firm*—Joseph P. Gastel

[57] ABSTRACT

A method of suppressing the formation of contrails from the exhaust of an engine operating in cold temperatures including the steps of providing a combined nucleating agent and freeze-point depressant selected from the group of water soluble monohydric, dihydric, trihydric or other polyhydric alcohols, or mixtures thereof, forming the solution into a vapor, and injecting the solution into the exhaust of the engine. The solution may include a non-corrosive surfactant. Another solution may include an organic or an inorganic nucleating agent, or mixtures thereof, in monohydric, dihydric or polyhydric alcohols, or mixtures thereof, and in addition may contain one or more surfactants.

31 Claims, No Drawings

METHOD OF SUPPRESSING FORMATION OF CONTRAILS AND SOLUTION THEREFOR

BACKGROUND OF THE INVENTION

The present invention relates to an improved method and composition for suppressing the formation of contrails from the exhaust of an engine, and is an improvement over the subject matter of U.S. Pat. No. 4,766,725, issued August 30, 1988.

By way of background, attempts have been made previously to suppress the formation of contrails from the exhaust of a jet engine. Pat. Nos. 3,517,505 and 3,517,512 teach the injection of chlorosulfonic acid into the exhaust of an engine to diminish the particle size of water below the visible range. However, this substance is extremely corrosive. Pat. No. 3,289,409 teaches the injection of carbon black into an aircraft engine effluent Numerous other patents teach the dispelling of fogs and clouds by dispersing various compounds therein. However, insofar as known, the various compounds or components thereof which were used for fog dispersal were never considered for use in suppressing the formation of contrails from engines operating in cold environments at high altitudes.

SUMMARY OF THE INVENTION

It is one object of the present invention to provide an improved method of suppressing the formation of contrails from the exhaust of an engine in a highly efficient manner.

Another object of the present invention is to provide improved solutions for suppressing the formation of contrails from the exhaust of an engine and which can be produced simply and economically and which are not combustible or corrosive. Other objects and attendant advantages of the present invention will readily be perceived hereafter.

The present invention relates to a method of suppressing the formation of contrails from the hot exhaust gases of an engine operating in cold temperatures comprising the steps of providing in relatively sufficient proportions any monohydric, dihydric, trihydric, or polyhydric alcohol, or mixtures thereof, with a compatible surfactant or surfactants or other compounds capable of exhibiting surface properties in any alcohol, -diol(glycol), -triol, or polyol, which include their homologues or general structural relatives, such as their condensation polymers in any form, and injecting such solution into said exhaust of said engine to effect hypernucleation of water in the said engine exhaust and lower the ultimate freezing point of overall exhaust mixtures.

The present invention also relates to a hypernucleating solution for condensing water vapor in engine exhausts to particles having a size below the humanly visible range comprising an alcohol solution for effecting hypernucleation and freezing point depression selected from the group of monohydric, dihydric, polyhydric alcohols, or mixtures thereof, and which may have other functional groups or structural features, such as substituents, unsaturation, and complexation of carbon chains.

The present invention also relates to a method of suppressing the formation of contrails from the hot exhaust gases of an engine operating in cold temperatures to particles having a size below the humanly visible range comprising the steps of providing an alcohol from the group of monohydric, dihydric, polyhydric alcohols, or mixtures thereof, and which may have other functional groups or structural features, such as substituents, unsaturation, and complexation of carbon chains, injecting into said exhaust gases to effect hypernucleation and freezing point depression of said water vapor.

The present invention also relates to a hypernucleating solution for condensing water vapor in engine exhaust to particles having a size below the humanly visible range comprising in relatively sufficient proportions to effect said hypernucleation a non-corrosive surfactant in a combined carrier and nucleating agent selected from the group of water soluble monohydric, dihydric or polyhydric alcohols, or mixtures thereof, which may have other functional groups or structural features, such as substituents, unsaturation, and complexation of carbon chain.

The present invention also relates to a method of preparing a contrail suppressing solution for effecting hypernucleation of the exhaust of an engine comprising the steps of dissolving a non-corrosive surfactant in a minimum amount of water while heating said water to obtain a molecular solution, heating a small amount of ethylene glycol to boiling, forming a combined solution of said molecular solution and said small amount of ethylene glycol and permitting cooling thereof, and adding a final amount of ethylene glycol to dilute said combined solution, when surfactants themselves may be somewhat less soluble in glycol.

The present invention also relates to a method of suppressing the formation of contrails from the hot exhaust gases of an engine operating in cold temperatures comprising the steps of providing in relatively sufficient proportions to effect hypernucleation of water in said engine exhaust a solution of an organic freezing point depressant and nucleating agent, or a mixture of organic and inorganic freezing point depressants and nucleating agents, and a combined carrier and nucleating agent and freezing point depressant selected from the group of water soluble monohydric, dihydric, trihydric and polyhydric alcohols, or derivatives thereof, or mixtures thereof, and injecting said solution into said exhaust of said engine.

The various aspects of the present invention will be more fully understood when the following portions of the specification are read.

The solution of the present invention includes a biodegradable low suds non-corrosive surfactant or synthetic detergent which could belong to any of the major categories, such as nonionic, cationic, anionic, or zwitterionic or other compounds containing structural features which could mimic surfactant properties and which will resist oxidation or decomposition in the hot exhaust gas atmosphere of an engine, which may be a gas turbine engine, turbojet engine, turbofan engine or rocket engine, and which will reduce the surface energy of water in the hot exhaust gas to promote hypernucleation. One such surfactant is obtainable under the trademark SPARKLEEN® and is manufactured by the Calgon Corporation of Pittsburgh, Pennsylvania. It is a sodium alkylsulfonate ($C_{12}$) and/or ($C_5$-$C_{16}$).

A number of other chemical companies, such as Air Products, Inc., Dow Chemical, E.I. DuPont, Emery Chemicals, G.A.F. Chemical Corporation, Pittsburgh Paints, and others manufacture a number of surfactants and market them under their trade names. At least one member of each category was tried in the laboratory to prove overall generic nature of the process. A number of these surfactants are listed by their trade names and structural features in the following table, and the companies are listed in alphabetical order. The list is by no means all inclusive and is offered to illustrate the wide range of surfactants which can be used in the current application.

| Company Name | Trade Name | Structural Features |
| --- | --- | --- |
| Air Products, Inc. | DH | Unsaturated diols |
| | SURFYNOL Series | Unsaturated -ols and diols, etc. |
| | SVS | Unsaturated sulfonates |
| Dow Chemical | DOWFAX Series | Sulfonic salts of phenyl ethers |
| E. I. DuPont | ALKANOL Series | Alkylaryl sulfonates |
| | DUPANOL Series | Alkyl, alkenyl sulfonates |
| | ZONYL Series* | Fluorosubstituted, sulfonates, phosphates, quarternary ammonium salts |
| Emery Industries | EMSORB Series | Esters |
| | EMERESTAT Series | Polyethylene glycols derivatives |
| | TRYCOL Series | Alcohols, diols, triols, etc. |
| | TRYMEEN Series | Ethoxylated amines |
| | EMERSAL Series | Sulfonic salts |
| G.A.F. Chemicals | Taurine-22 Series | Aminosulfonates |
| | Isethionic Acid | Hydroxysulfonates |
| | SVS | Unsaturated sulfonates |
| Henekel | DUO-CURE Series | Proprietary |
| Morton Thiokol | Ethanesulfonic Acid | 2-C Chain sulfonate |
| Pittsburgh Paints | Alkyl Sulfonates | Alkyl sulfonates |
| | Alkyl Amines | Alkyl amines |

*These are listed in greater detail in U.S. Pat. No. 4,766,725, and are incorporated herein by reference.

Any of the above-listed surfactants or mixtures thereof may be present in an amount by weight of between about 0.001% to 80% or saturation, and more preferably between 5% and 30% and most preferably between 10% and 20%, or the critical micelle concentrations.

Another component of the solution is a water miscible monohydric, dihydric, trihydric or other polyhydric alcohol or mixtures thereof, which include their homologs, or general structural relatives, such as their condensation polymers in any structural form or functional groups, such as substituents, unsaturation, and complexation of carbon chains, or derivatives thereof. All of the foregoing are considered hereafter to be covered under the general term alcohols, glycols, etc. where they are not specifically mentioned by name. The above-mentioned alcohols can themselves be used individually without surfactants, as set forth in greater detail hereafter, or as mixtures by themselves without surfactants, in contrail suppressing solutions, though, when used individually or in combinations, they are not as efficient as alcohol-surfactant mixtures. For example, when the alcohol is ethylene glycol, it can be used by itself, or when it is used in solution with other components, such as surfactants, it could present from 10% to 99% in a contrail suppression solution or, more preferably, 30% to 90% or most preferably, 75% to 85%. The relative amount of each component is determined by the molecular structure of alcohol, its freezing point, chemical nature of the surfactant or surfactant mixtures, and the solubility of the organic or inorganic nucleating agents. When some of the surfactants such as the above listed G.A.F. chemicals are used in solution with ethylene glycol, the solution also contains a small amount of water. The water may be present in an amount by weight of between about 0.01% and 15%, and more preferably between about 1.5% and 10%, and most preferably between about 1.7% and 4%. The water is necessary for dissolving the G.A.F. chemicals and certain other of the above-listed chemicals, such as SVS, TRYCOLS, isethionic acid, Taurine-22, etc., according to the following exemplary procedure. Into 5 grams of water, which is a small amount, 0.13 to 30 grams of the above-mentioned surfactants are poured into 5 to 30 ml of hot water. The mixture was heated and was boiled for five minutes to produce a molecular solution which was clear. 10 to 100 milliliters of ethylene glycol were then heated to a boil and the boiled water solution of the above-mentioned surfactants was poured into the boiled ethylene glycol while both were at boiling temperature. This amount of ethylene glycol may otherwise be within 5% and 20% of the total weight of the mixture at this stage. This mixture is stirred thoroughly until clear and thereafter cooled. The resulting solution was then diluted to 100 to 250 milliliters by the addition of ethylene glycol. The foregoing procedure is not required with the surfactants which are easily soluble in ethylene glycol or other alcohols. The water carrier may be unnecessary for surfactants which are completely soluble in alcohols, glycols, etc. Where the surfactant is completely soluble in the alcohol, no special procedure is required for the mixing operation. It is merely necessary to add the components and stir them.

When the surfactants were sulfonates or phosphates and were not readily soluble in alcohol, the surfactants were dissolved in a minimum amount of boiling water with constant stirring, and the glycol or alcohol was added in installments to obtain as clear a solution as possible of the desired concentration. In other instances, alcohol, glycol, diethylene glycol, triethylene glycol, tetraethylene glycol, or polyethylene glycols or polyols were heated separately to boiling and added when hot to the slurry of the surfactant. The mixture was gently heated and continuously stirred until a clear solution was obtained. Extremes of concentrations of surfactants used were from 0% to 79% when surfactants were nonionic diols or ammonia derivatives. Though all water soluble alcohols were efficacious, formulations were made with methanol, ethanol, 1-propanol, 2-propanol, allyl alcohol, ethylene glycol, diethylene glycol, triethylene glycol, tetraethylene glycol, polyethylene glycol, glycerol, etc., and their mixtures. It will be appreciated that the method of preparation may involve any specialized dissolution, known in the art, of any appropriate surfactant in ethylene, di, tri, tetra, and polyethylene glycols or monohydric alcohols, such as methanol, ethanol, 1 and 2 propanol, allyl alcohol, or triols, polyols, or mixtures thereof.

Solutions were also formulated by mixing any one of the non-corrosive surfactants with alcohols. In this respect, the solution contained approximately 0.001% to saturation of the non-corrosive surfactant in an alcohol, such as ethanol, methanol, isopropanol, propanol, allyl alcohol, etc., or mixtures thereof. In such solutions the non-corrosive surfactant may be present by weight in an amount of between about 0.001% and saturation, and more preferably in an amount of between about 0.07% and 20%, and most preferably in an amount of between about 0.1% and 5%. Any of the alcohols, or mixtures thereof, listed previously in this specification, may be present by weight in an amount of between about 25% and 99.9%, and more preferably in an amount of between about 80% and 99%, and most preferably in an amount of between about 95% and 99%, respectively. If desired, a small amount of water or glycerol may be added to the solution to make up a total of 100%. The combined carrier, nucleating agent, and freezing point depressant may be any one of the monohydric, dihydric, trihydric or polyhydric alcohols or mixtures thereof to produce the total alcohol content.

The hypernucleating solution may also contain mixtures of any of the above-discussed surfactants such that the total amount of surfactant falls within the above ranges given for a single surfactant.

The nucleating ability of all of the above mentioned solutions is further enhanced by adding inorganic or organic nucleating compounds, or mixtures thereof, which are also freezing point depressants. The inorganic compounds may be ammonium fluoride, ammonium iodide, ammonium chloride, calcium chloride, silver iodide, ammonium thiocyanate, cadmium iodide, chromium bromide, cobalt iodide ($\alpha$), ferric chloride, tin halides, bismuth trichloride, thalium chloride, or other water, alcohol, and glycol soluble salts. The organic nucleating compounds may be chemicals, such as phloroglucinol, ethylenediaminetetraacetate, catechol and others which have ready made hydrogen bonding centers in their molecular structure and possess straight, side chain, cyclic, or chelic structures which will facilitate the initial formation of pre-nucleation clusters. The added components listed above are hygroscopes or nucleating agents preferably with ice-compatible crystal structures and thermodynamic properties, such as volatilization, sublimation or boiling temperatures, solubility or surface energy reduction compatible with those of the surfactant mixtures of alcohols and/or glycols and/or polyols. Other compounds meeting any or all of the foregoing criteria can also be used as additives. The ability to form a eutectic is desirable but not necessary. A mixture may contain by weight 1% to saturation of the salt or organic compound and more preferably may contain 2% to 12% thereof and most preferably may contain 3% to 7% thereof. The mixture would include a monohydric, dihydric, trihydric and/or a polyhydric alcohol or mixtures thereof. The weight percent of salt or organic compound, or mixtures thereof, is also governed by its overall molecular weight, e.g., a much greater weight percent of silver iodide would be needed compared to ammonium fluoride because molar weight of silver iodide (AgI) is 235 while that of ammonium fluoride ($NH_4F$) is only 37. All of the above inorganic and organic nucleating compounds are completely soluble in the alcohol-surfactant mixtures and therefore no special procedure is necessary for mixing them.

When the inorganic or organic nucleating agent, or combinations thereof, is added in the foregoing amounts, the other components of the solution are reduced proportionately. For example, the surfactant, or combinations thereof, may be present by weight in an amount of between about 0.001% and 50% and the combined carrier and nucleating agent, or combinations thereof, may be present in an amount between about 30% and 98% when the inorganic or organic nucleating agent, or combinations thereof, is present in an amount of between about 1% and 20%. Furthermore, and more preferably, the surfactant may be present in an amount of between about 0.06% and 25% and the combined carrier and nucleating agent may be present in an amount of between 68% and 97% when the inorganic or organic nucleating agent is present in an amount of between about 2% and 12%. Furthermore, and most preferably, the surfactant may be present in an amount of between about 0.1% and 10% when the combined carrier and nucleating agent is present in an amount of 2% and 90% when the inorganic or organic nucleating agent is present in an amount of between 3% and 7%.

Any one of the above-mentioned inorganic salts or organic nucleating compounds, or mixtures thereof, may be added to any one of the above-mentioned alcohols, or to mixtures thereof, without the addition of surfactants. In this respect the salt or compound, or mixtures thereof, could be present in an amount by weight of between about 1% and 20%, and more preferably between about 2% and 12%, and most preferably between about 3% and 7%. The remainder of the mixture would be any one of the above-mentioned alcohols, or mixtures thereof, either full strength or diluted with water. The hypernucleating solution thus formed would be operative, but not as effective as mixtures containing a surfactant in the sense that much greater amounts would be required. No special procedure is necessary for combining the alcohol and inorganic salt or organic nucleating compound, or mixtures thereof, other than mixing them.

The component of the solution to which the non-corrosive surfactant is added is both a carrier and a nucleating agent which may fall within the class of water soluble monohydric, dihydric, trihydric and polyhydric water miscible alcohols, which include the above-discussed alcohols including ethanol, methanol and ethylene glycol and glycerol, all of which are also freezing point depressants.

In use, the solution is preferably injected in vapor form into the exhaust gases of a jet engine, but it may be sprayed into the exhaust in liquid form. It may be formed into a vapor by suitable heating or spraying or by any other suitable mode of vaporization, such as air atomization. The exhaust gases leave the jet engine at about 950° F. (about 450° C.), and pass through an exhaust pipe before they enter a high altitude low pressure environment wherein the temperature is as low as $-50°$ C. The hypernucleation solution is injected into the exhaust gases in the exhaust pipe. The injected solution of the present invention produces hypernucleation of the water vapor in the exhaust gases while they are in the exhaust pipe about to exit into the atmosphere because the injected solution lowers the surface energy requirements for droplet formation. In addition, the solution depresses the freezing point. The hypernucleation and freezing point depression cause the formation of ice crystal structure sizes which are outside of the humanly visible range, namely, between 0.01 and 0.2 microns, when the jet engine operates in the cold low pressure environments which are experienced at high altitudes.

In laboratory testing it was found that the amount of hypernucleating solution of the present invention which can be injected into the engine exhaust gases may be by weight between about 1% and 25% of the weight of the jet fuel, and more preferably between about 3% and 15%. Actual tests were performed wherein the amount of hypernucleating agent of the present invention which was used was about 12% of the weight of the jet fuel which was consumed. The foregoing applies to hypernucleating solutions which do not include the above-mentioned inorganic nucleating agents. However, when hypernucleating solutions which include the inorganic or organic nucleating agents, or mixtures thereof, are used, the amount required is reduced to about 40% of the amount of solutions which do not include the inorganic agent. The exact amount of hypernucleating agent which is used will be controlled by the pilot of the aircraft and it depends on plane altitude and various meteorological factors such as temperature, atmospheric pressure and relative humidity.

EXAMPLES OF SOLUTIONS WHICH PROVED SATISFACTORY IN THE LABORATORY TO THE VISUALLY PERCEPTIBLE RANGE THUS CAPABLE OF SUPPRESSING CONTRAILS

The examples are given under functional group tables representing only a few of the many possible combinations.

TABLE I

EXAMPLES OF ALCOHOLS, DIOLS AND POLYOLS

| REAGENT | PERCENT OF SOLUTION BY WEIGHT | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Methanol | 100 | 0 | 0 | 0 | 0 | 0 | 0 | 0 | 0 | 0 | 0 | 0 | a |
| Ethanol | 0 | 100 | 0 | 0 | 0 | 0 | 0 | 0 | 0 | 0 | 0 | 0 | b |
| 2-Propanol | 0 | 0 | 100 | 0 | 0 | 0 | 0 | 0 | 0 | 0 | 0 | 0 | c |
| 1-Propanol | 0 | 0 | 0 | 100 | 0 | 0 | 0 | 0 | 0 | 0 | 0 | 0 | d |
| Other Alcohols | 0 | 0 | 0 | 0 | 100 | 0 | 0 | 0 | 0 | 0 | 0 | 0 | e |
| Ethylene Glycol | 0 | 0 | 0 | 0 | 0 | 100 | 0 | 0 | 0 | 0 | 0 | 0 | f |
| Diethylene Glycol | 0 | 0 | 0 | 0 | 0 | 0 | 100 | 0 | 0 | 0 | 0 | 0 | g |
| Triethylene Glycol | 0 | 0 | 0 | 0 | 0 | 0 | 0 | 100 | 0 | 0 | 0 | 0 | h |
| Tetraethylene Glycol | 0 | 0 | 0 | 0 | 0 | 0 | 0 | 0 | 100 | 0 | 0 | 0 | i |
| Any Glycol | 0 | 0 | 0 | 0 | 0 | 0 | 0 | 0 | 0 | 100 | 0 | 0 | j |
| Glycerol | 0 | 0 | 0 | 0 | 0 | 0 | 0 | 0 | 0 | 0 | 100 | 0 | k |
| Any Polyol | 0 | 0 | 0 | 0 | 0 | 0 | 0 | 0 | 0 | 0 | 0 | 100 | l |

1. Where $a + b + c + d + e + f + g + h + i + j + k + l = 100$, and
2. Where any one of a, b, c, etc. could be equal to zero or could assume any convenient value from zero to 100, and thus the agent may be composed of one alcohol, two alcohols, alcohol and a glycol, two glycols, three glycols and alcohols, etc.

TABLE II

EXAMPLES OF NON-IONIC SURFACTANTS USED WITH ETHYLENE GLYCOL OR ANY ONE OR A COMBINATION OF THE COMPOUNDS OF TABLE I

| REAGENT | PERCENT OF SOLUTION BY WEIGHT | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Ethylene Glycol | 100 | 95 | 90 | 80 | 70 | 50 | 20 | 95 | 90 | 80 | 70 | 60 | 80 | 80 | a |
| Surfynol D.H. or Dimethyl-hexynediol | 0 | 5 | 10 | 20 | 30 | 50 | 80 | 1 | 2 | 5 | 15 | 20 | 1 | 19 | b |
| Nucleating Compounds | 0 | 0 | 0 | 0 | 0 | 0 | 0 | 4 | 8 | 15 | 15 | 20 | 19 | 1 | c |

Where $a + b + c = 100$, and a, b, c can assume any convenient value as illustrated above from 0–100.
Any one of the compounds or mixtures thereof of TABLE I can be substituted for Ethylene glycol.
Any number of commercially available surfactants, such as listed previously, can be substituted for Surfynol D.H. or for Dimethylhexynediol.
Nucleating compounds could be any alcohol-glycol soluble inorganic or organic compound, or mixtures thereof, possessing the structural features to collect water around it, and may include any of the organic or inorganic compounds listed previously.

TABLE III

| REAGENT | PERCENT OF SOLUTION BY WEIGHT 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Ethylene Glycol | 50 | 70 | 0 | 99.9 | 0 | 50 | 50 | 40 | 20 | 50 | 80 | 70 | 0 | 80 | a |
| Tetra-ethylene Glycol | 50 | 0 | 70 | 0 | 99 | 0 | 0 | 40 | 50 | 20 | 0 | 0 | 70 | 0 | b |
| G.A.F. Taurine-22 | 0 | 30 | 30 | .1 | 1 | 40 | 30 | 10 | 20 | 20 | 1 | 10 | 10 | 19 | c |
| Nucleating Compounds such as $NH_4I$ or Phloro- | 0 | 0 | 0 | 0 | 0 | 10 | 20 | 10 | 10 | 10 | 19 | 20 | 20 | 1 | d |

TABLE III-continued

| REAGENT | PERCENT OF SOLUTION BY WEIGHT | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| glucinol etc. | | | | | | | | | | | | | | | |

Where a + b + c + d = 100, and a, b, c, d can assume any convenient value as illustrated above from 0–100.
Any one of the compounds of TABLE I, or mixtures thereof, can be substituted for Ethylene glycol tetraethyleneglycol.
Any surfactant, listed previously, or mixtures thereof can be substituted for G.A.F. Taurine-22
Nucleating compounds could be a pure organic or inorganic compound, such as listed above, or any mixture of alcohol/glycol soluble inorganic salts or organic compounds with appropriate structure.

TABLE IV

EXAMPLES OF ANIONIC SURFACTANTS-SULFONATES

| REAGENT | PERCENT OF SOLUTION BY WEIGHT | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| Ethylene Glycol | 90 | 90 | 90 | 40 | 80 | 80 | 90 | 70 | 50 | 0 | 0 | 0 | 0 | a |
| Tetraethylene Glycol | 0 | 0 | 5 | 40 | 0 | 0 | 0 | 3 | 20 | 90 | 80 | 0 | 20 | b |
| Isopropanol | 5 | 0 | 0 | 0 | 10 | 0 | 0 | 2 | 5 | 0 | 0 | 80 | 0 | c |
| Methanol | 0 | 5 | 0 | 0 | 0 | 0 | 0 | 2 | 5 | 0 | 0 | 0 | 70 | d |
| Alkyl Sulfonate | 5 | 0 | 0 | 0 | 2 | 2 | 0 | 1 | 0 | 2 | 3 | 1 | 0 | e |
| Alkylaryl Sulfonate | 0 | 5 | 0 | 0 | 2 | 2 | 0 | 1 | 5 | 2 | 3 | 2 | 0 | f |
| Alken-alkynal-aryl Sulfonate | 0 | 0 | 5 | 5 | 2 | 2 | 0 | 1 | 3 | 2 | 0 | 3 | 0 | g |
| Small chain Sulfonate | 0 | 0 | 0 | 5 | 2 | 2 | 0 | 1 | 2 | 2 | 0 | 0 | 10 | h |
| Alkyl, alkenyl, alkynal-aryl Phosphate | 0 | 0 | 0 | 5 | 2 | 2 | 0 | 1 | 0 | 2 | 0 | 0 | 0 | i |
| Nucleating Compounds CuBr$_2$, CdI$_2$, CaCl$_2$, NH$_4$I, etc. Poloroglucinol, EDTA, etc. | 0 | 0 | 0 | 5 | 0 | 10 | 10 | 18 | 0 | 0 | 14 | 14 | 0 | j |

Where a + b + c + d + e + f + g + h + i + j = 100, and
Where a, b, c, etc. can assume any convenient value from 0% to 100%, and
Where any alcohol, glycol or polyol can be used for any of the alcohols, and
Where any anionic surfactant, sulfonate, carboxylate, alcoholate, phosphate with unsubstituted, mono or polysubstituted carbon chain can be substituted for the surfactants-sulfonates listed above.

TABLE V

EXAMPLES OF CATIONIC SURFACTANTS

| REAGENT | PERCENT OF SOLUTION BY WEIGHT | | | | | | | | | | |
|---|---|---|---|---|---|---|---|---|---|---|---|
| | 1 | 2 | 3 | 4 | 5 | 6 | 7 | 8 | 9 | 10 | 11 |
| Ethylene Glycol | 90 | 90 | 80 | 80 | 70 | 0 | 0 | 0 | 10 | 60 | a |
| Allyl Alcohol | 0 | 0 | 0 | 10 | 20 | 70 | 0 | 0 | 70 | 20 | b |
| Tetraethylene Glycol | 0 | 0 | 0 | 0 | 5 | 0 | 70 | 95 | 0 | 10 | c |
| Cationic Surfactant e.g. Quaternary Ammonium salt, amino derivative or other cationic feature | 10 | 5 | 10 | 5 | 1 | 25 | 15 | 5 | 5 | 1 | d |
| Nucleating Compounds | 0 | 5 | 10 | 5 | 4 | 15 | 15 | 0 | 15 | 9 | e |

Where a + b + c + d + e = 100, and
Where a, b, c etc. can assume any convenient value from 0 to 100, and
Where any alcohol, polyol, glycol listed in TABLE I or mixtures thereof could be used for any alcohol listed, and
Any cationic surfactant, such as Trymeen Series of Emery, Taurine from G.A.F. etc. can be substituted or used in conjunction with other surfactants, and
Where the nucleating compound is any one of the above-listed organic or inorganic compounds, or mixtures thereof.

The testing of the various solutions set forth in the above tables was effected as follows: A chamber was cooled to −80° C. by a suitable refrigerant which was passed into a jacket surrounding the chamber. Nitrogen gas was fed through a coil immersed in a liquid nitrogen tank and cooled to −80° C. and then fed to the chamber. A combined steam and agent nozzle was provided which included an agent jet located concentrically within a steam jet such that the steam and agent were simultaneously sprayed into the −80° C. chamber containing nitrogen, with the agent being forced from its nozzle by a suitable pump. Ice crystals of a visually detectable size were not observed in the chamber, even though the steam nozzle exhausted 100% water into the −80° C. nitrogen atmosphere. In another series of tests the flow rate of cold gases were increased to Mach 0.6 level to simulate actual flights of a jet plane and complete suppression of contrail was observed at appropriate agent and engine power settings.

Briefly summarizing the foregoing, the agents for suppression of contrails from the exhaust of a jet engine or plume of a rocket engine exhaust may consist of mono, di, tri, tetra, and polyhydric alcohols chemically referred as -ols, -diols (glycols), -triols, -tetra and -polyols. The alcohols may be pure or mixtures or various compositions thereof. The alcohol mixtures may further contain by weight, non-ionic, cationic, anionic, or zwitterionic surfactants between 0.001% to 90% of the total solution. Another solution may contain a mixture of surfactants or cosurfactants of suitable concentrations which may vary from 0.001 to 90%, 1.0 to 50%, or 10 to 20% by weight of the total solution. Another solution may contain ice nucleating organic compounds or inorganic nucleating salts with cubic, rhombic, or hexagonal crystal structures such as ammonium fluoride, ammonium iodide, calcium chloride, etc., which may or may not be hygroscopes by themselves, in addition to surfactants in the mono, di, tri, tetra, or polyhydric alcohols. The alcohols may have other functional groups or structural features present in their structures. Appropriate amounts of water or cosurfactants may be used to bring all the components into a homogeneous solution.

While preferred embodiments of the present invention have been disclosed, it will be appreciated that it is not limited thereto but may be otherwise embodied within the scope of the following claims.

I claim:

1. A method of suppressing the formation of contrails from water vapor in the hot exhaust gases of an engine operating in cold temperatures comprising the steps of providing at least one alcohol which is a combined nucleating agent and freezing point depressant, and injecting said alcohol into said hot exhaust gases of said engine for reducing ice particles formed from said water vapor to a size below a humanly visible range.

2. A method as set forth in claim 1 including the step of forming said alcohol into a vapor before said step of injecting said alcohol into said exhaust.

3. A method as set forth in claim 1 wherein said at least one alcohol is selected from the group consisting of monohydric, dihydric and trihydric alcohols.

4. A method as set forth in claim 1 including an organic nucleating agent in solution with said alcohol.

5. A method as set forth in claim 4 wherein said alcohol combined nucleating agent and freezing point depressant is present in an amount by weight of between about 25% and 99.9%, and wherein said organic nucleating agent is present in an amount by weight of between about 0.001% and saturation.

6. A method as set forth in claim 4 wherein said alcohol is present in an amount by weight of between about 80% and 99%, and wherein said organic nucleating agent is present in an amount by weight of between about 0.001% and saturation.

7. A method as set forth in claim 4 wherein said alcohol is present in an amount by weight of between about 95% and 99%, and wherein said organic nucleating agent is present in an amount by weight of between about 0.001% and saturation.

8. A method as set forth in claim 4 wherein said organic nucleating agent is selected from the group consisting of phloroglucinol, ethylenediaminetetraacetate, and catechol.

9. A method as set forth in claim 1 wherein said alcohol is selected from the group consisting of a glycol, glycerol and polyol.

10. A method as set forth in claim 1 wherein said alcohol is selected from the group consisting of methanol, ethanol, 2-propanol, 1-propanol, ethylene glycol, diethylene glycol, thiethylene glycol, tetraethylene glycol and glycerol.

11. A method as set forth in claim 1 wherein said alcohol is ethylene glycol.

12. A method as set forth in claim 1 wherein said alcohol comprises a mixture of plurality of alcohols.

13. A method as set forth in claim 4 including a non-corrosive surfactant.

14. A method as set forth in claim 13 wherein said non-corrosive surfactant is selected from the group consisting of nonionic, cationic, anionic, and zwitterionic surfactants.

15. A method as set forth in claim 13 wherein said surfactant is present by weight in an amount of between about 0.001% to saturation.

16. A method as set forth in claim 13 wherein said surfactant is present by weight in an amount of between about 0.07% and 20%.

17. A method as set forth in claim 13 wherein said surfactant is present by weight in an amount of between about 0.1% and 5%.

18. A method as set forth in claim 13 wherein said non-corrosive surfactant is a sulfonate.

19. A method as set forth in claim 1 including in sufficient proportions with said alcohol to effect said hypernucleation a sulfonate with an unsubstituted mono or polysubstituted carbon chain.

20. A method as set forth in claim 1 including in sufficient proportions with said alcohol to effect said hypernucleation a carboxylate with an unsubstituted mono or polysubstituted carbon chain.

21. A method as set forth in claim 1 including in sufficient proportions with said alcohol to effect said hypernucleation an alcoholate with an unsubstituted mono or polysubstituted carbon chain.

22. A method as set forth in claim 1 including in sufficient proportions with said alcohol to effect said hypernucleation a phosphate with an unsubstituted mono or polysubstituted carbon chain.

23. A method as set forth in claim 19 including an organic nucleating agent.

24. A method as set forth in claim 20 including an organic nucleating agent.

25. A method as set forth in claim 21 including an organic nucleating agent.

26. A method as set forth in claim 22 including an organic nucleating agent.

27. A method as set forth in claim 4 including an inorganic nucleating agent.

28. A method as set forth in claim 27 wherein said inorganic nucleating agent is selected from the group consisting of ammonium fluoride, ammonium iodide, ammonium chloride, calcium chloride, silver iodide, ammonium thiorcyanate, cadmium iodide, chromium bromide, cobalt iodide (α), ferric chloride, tin halides, bismuth trichloride, and thalium chloride.

29. A method as set forth in claim 27 wherein said inorganic nucleating agent is present by weight in an amount of between about 1% and saturation.

30. A method as set forth in claim 27 wherein said inorganic nucleating agent is present by weight in an amount of between about 2% and 12%.

31. A method as set forth in claim 27 wherein said inorganic nucleating agent is present by weight in an amount of between about 3% and 7%.

* * * * *

UNITED STATES PATENT AND TRADEMARK OFFICE
CERTIFICATE OF CORRECTION

PATENT NO. : 5,005,355
DATED : April 9, 1991

INVENTOR(S) : Surjit Singh

It is certified that error appears in the above-identified patent and that said Letters Patent is hereby corrected as shown below:

Column 8, lines 1-4, correct the heading to read:

--EXAMPLES OF SOLUTIONS WHICH PROVED SATISFACTORY IN THE LABORATORY TO HYPERNUCLEATE WATER VAPOR TO BELOW THE VISUALLY PERCEPTIBLE RANGE THUS CAPABLE OF SUPPRESSING CONTRAILS--.

Column 11, lines 56 and 57 (claim 5), delete "combined nucleating agent and freezing point depressant".

Column 12, line 18 (claim 12), before "plurality" insert --a--.

Signed and Sealed this

Twenty-seventh Day of October, 1992

*Attest:*

DOUGLAS B. COMER

*Attesting Officer*

*Acting Commissioner of Patents and Trademarks*